United States Patent
Andreina et al.

(10) Patent No.: US 11,983,290 B2
(45) Date of Patent: May 14, 2024

(54) METHOD AND DISTRIBUTED LEDGER SYSTEM FOR SUPPORTING IDENTITY MANAGEMENT OF TRAVELERS IN AN AIRPORT

(71) Applicant: NEC Laboratories Europe GmbH, Heidelberg (DE)

(72) Inventors: Sebastien Andreina, Heidelberg (DE); Alessandro Sforzin, Heidelberg (DE); Ghassan Karame, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 302 days.

(21) Appl. No.: 17/598,321

(22) PCT Filed: Aug. 22, 2019

(86) PCT No.: PCT/EP2019/072530
§ 371 (c)(1),
(2) Date: Sep. 27, 2021

(87) PCT Pub. No.: WO2020/192948
PCT Pub. Date: Oct. 1, 2020

(65) Prior Publication Data
US 2022/0179988 A1  Jun. 9, 2022

(30) Foreign Application Priority Data
Mar. 28, 2019 (EP) .................... 19165870

(51) Int. Cl.
*G06F 21/62* (2013.01)
*G06F 21/32* (2013.01)
*G06Q 50/30* (2012.01)

(52) U.S. Cl.
CPC .......... *G06F 21/6218* (2013.01); *G06F 21/32* (2013.01); *G06Q 50/30* (2013.01); *G06Q 2220/00* (2013.01)

(58) Field of Classification Search
CPC ..... G06F 21/32; G06F 21/6218; G06Q 50/30; G06Q 2220/00; H04L 9/50
See application file for complete search history.

(56) References Cited

U.S. PATENT DOCUMENTS

| 11,392,947 B1 * | 7/2022 | Prasad ............. G06Q 20/40155 |
| 2004/0078335 A1 | 4/2004 | Calvesio et al. |

(Continued)

FOREIGN PATENT DOCUMENTS

WO   WO 2018/039374 A1   3/2018

OTHER PUBLICATIONS

Li, Wenting et al.; "Towards Scalable and Private Industrial Blockchains"; *Proceedings of the ACM Workshop on Blockchain, Cryptocurrencies and Contracts*; Apr. 2, 2017; pp. 9-14; XP055397747; ACM Publications; New York, NY, USA.

(Continued)

*Primary Examiner* — Thaddeus J Plecha
(74) *Attorney, Agent, or Firm* — Leydig, Voit & Mayer, Ltd.

(57) ABSTRACT

A method for supporting identity management of travelers in an airport using a distributed ledger system includes receiving, by a global identity blockchain, a registration request from a traveler via a traveler device. The registration request includes a commitment for identity data that is uploaded by the traveler in a secure cloud storage. The method further includes recording the commitment in the global identity blockchain, receiving, by the global identity blockchain, a result of an identity verification with respect to the traveler from a verifier entity, recording the result in the global identity blockchain, and receiving, by a security blockchain, a ticket registration transaction issued by an airline entity. The ticket registration transaction comprises a unique traveler ID of the traveler. The method further includes issuing, (Continued)

by the security blockchain, an access control list update upon reception of consent by the traveler.

14 Claims, 8 Drawing Sheets

(56) References Cited

U.S. PATENT DOCUMENTS

| | | |
|---|---|---|
| 2017/0257358 A1 | 9/2017 | Ebrahimi et al. |
| 2018/0139043 A1 | 5/2018 | Jayachandran et al. |
| 2018/0227131 A1* | 8/2018 | Ebrahimi .............. H04L 9/3297 |
| 2019/0251573 A1* | 8/2019 | Toyota ................ H04L 9/3236 |
| 2020/0145219 A1* | 5/2020 | Sebastian ................ G06F 21/32 |

OTHER PUBLICATIONS

Shocard Inc.; *"Identity Management Verified Using the Blockchain ShoCard with ShoCoin Tokens Whitepaper"*; Dec. 13, 2018; pp. 1-24; XP093050675; ShoCard Inc.; Cupertino, CA, USA.

Robinson, Peter; "Requirements for Ethereum Private Sidechains"; *Cryptography and Security*; Jun. 26, 2018; pp. 1-34; vol. 1; XP080894565; ArXiv.org, Cornell University; Ithaca, NY, USA.

* cited by examiner

METHOD AND DISTRIBUTED LEDGER SYSTEM FOR SUPPORTING IDENTITY MANAGEMENT OF TRAVELERS IN AN AIRPORT

CROSS REFERENCE TO RELATED APPLICATIONS

This application is a U.S. National Phase application under 35 U.S.C. § 371 of International Application No. PCT/EP2019/072530, filed on Aug. 22, 2019, and claims benefit to European Patent Application No. EP 19165870.7, filed on Mar. 28, 2019. The International Application was published in English on Oct. 1, 2020, as WO 2020/192948 A1 under PCT Article 21(2).

FIELD

The present disclosure relates to a method for supporting identity management of travelers in an airport using a distributed ledger system. Furthermore, the present disclosure relates to a distributed ledger system for supporting identity management of travelers in an airport.

BACKGROUND

Airports are very complex systems through which millions of people travel every day. Their complexity has reached a point where a traveler can hardly understand what is going on behind the scenes. What seems a straightforward workflow—drop your luggage at check-in counter, go through metal detectors, board the plane, disembark, retrieve your luggage—is in reality made possible by many processes working in unison to make it all happen. One such process is identity management. Indeed, the identity of every passenger/traveler has to be verified in order to ensure that the traveler is not dangerous, and that the traveler really is who he claims to be. Therefore, at each checkpoint, the traveler has to show some valid ID (e.g., a passport), a valid ticket, and possibly a valid entry visa if the country of destination requires one (e.g., ESTA: Electronic System for Travel Authorization).

Identity management is a challenging task, even more so when it involves multiple parties that do not trust each other and therefore do not share their databases. The immediate consequence is that travelers' identities are verified at each checkpoint. This lack of efficiency not only costs time and money, it also reduces the security guarantees that an airport can provide, because of human errors and database inconsistencies. Databases managed by different organizations will most likely have some divergence, because they are not synchronized, and the lack of synchronicity can lead to failing to detect potential threats. The ever-rising costs of security are also a factor that must be taken into account. Indeed, as may be obtained from the non-patent literature of Gillen and W. G. Morrison, "Aviation security: Costing, pricing, finance and performance", Journal of Air Transport Management, vol. 48, pp. 1-12, 2015, the US government funding for Transportation Security Agency (TSA) reached almost 8 billion in 2013 from 2.2 billion in 2002.

Airport security is a complex process that requires travelers to go through multiple checkpoints that require identity verification. In most cases, travelers already give their identity information when they buy a ticket via the airline's website. What commences upon a traveler's arrival at an airport is a series of identity checks that, while being vital to ensure the other passengers' safety, always comprise showing a valid ID and a valid flight ticket.

A possible solution to the problem would be for each checkpoint to share the outcome of their identity verification. Unfortunately, this is not feasible in practice, because of the many third parties that participate in the airport security process. Namely, they are independent organizations that are not willing to share their data with other organizations. In a typical airport, airlines handle travelers' check-ins and baggage drop, airport security carries out cabin baggage inspection, governments manage border control checks, and finally airlines take over again to handle the boarding process. This process is mirrored when travelers reach their destination airport.

All the aforementioned organizations are tasked with the storage of travelers' identity information. In the case of governments, additional information may be present, such as criminal records. The reluctance, then, of organizations to share their databases of travelers' information with other parties is understandable, but it opens the door to a host of inefficiencies (e.g., human errors, inconsistent information) that may lead to security issues.

Airlines are aware of the lengthy process that their passengers have to go through. Indeed, they offer an "online check-in" option to speed things up for those travelers that have only cabin baggage. However, these customers can thus skip only the first step of the chain of security checks. Therefore, the handling at the airport is still inefficient and cumbersome for the travelers.

The non-patent literature of WORLD ECONOMIC FORUM: "The Known Traveller: Unlocking the potential of digital identity for secure and seamless travel", January 2018, deals with solutions for supporting a seamless travel for a traveler at the airport. The document describes a method about the known traveler digital identity for secure and seamless travel, wherein the method can use a blockchain mechanism for achieving a more secure and seamless traveler journey. However, the known method has all system's entities join a single blockchain and, hence, does not address the problem according to which these stakeholders are not interested in joining their own databases in a single blockchain database together with all individual member hosts/entities participating in the blockchain. This cause major issues. With regard to scalability, for example, a system where its participants/entities are all using the same blockchain would not scale. Further, with regard to privacy, it is very hard and intricate to share data in a private manner if everyone is on the same blockchain.

SUMMARY

In an embodiment, the present disclosure provides a method for supporting identity management of travelers in an airport using a distributed ledger system. The distributed ledger system including a global identity blockchain and several security blockchains. The global identity blockchain is accessible by entities of the distributed ledger system. A respective security blockchain of the several security blockchains is employed for a predetermined flight segment. The respective security blockchain is accessible only by entities of the distributed ledger system that are involved in the predetermined flight segment. The method includes receiving, by the global identity blockchain, a registration request from a traveler via a traveler device. The registration request includes a commitment for identity data that is uploaded by the traveler in a secure cloud storage. The method further includes recording the commitment in the global identity blockchain, receiving, by the global identity blockchain, a result of an identity verification with respect to the traveler from a verifier entity, recording the result in the global identity blockchain, and receiving, by the respective security blockchain, a ticket registration transaction issued by an airline entity. The ticket registration transaction comprises a unique traveler ID of the traveler. The method further includes issuing, by the respective security blockchain, an access control list update upon reception of consent by the traveler in order to allow one or more entities to have access to the identity data of the traveler stored in the secure cloud storage.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
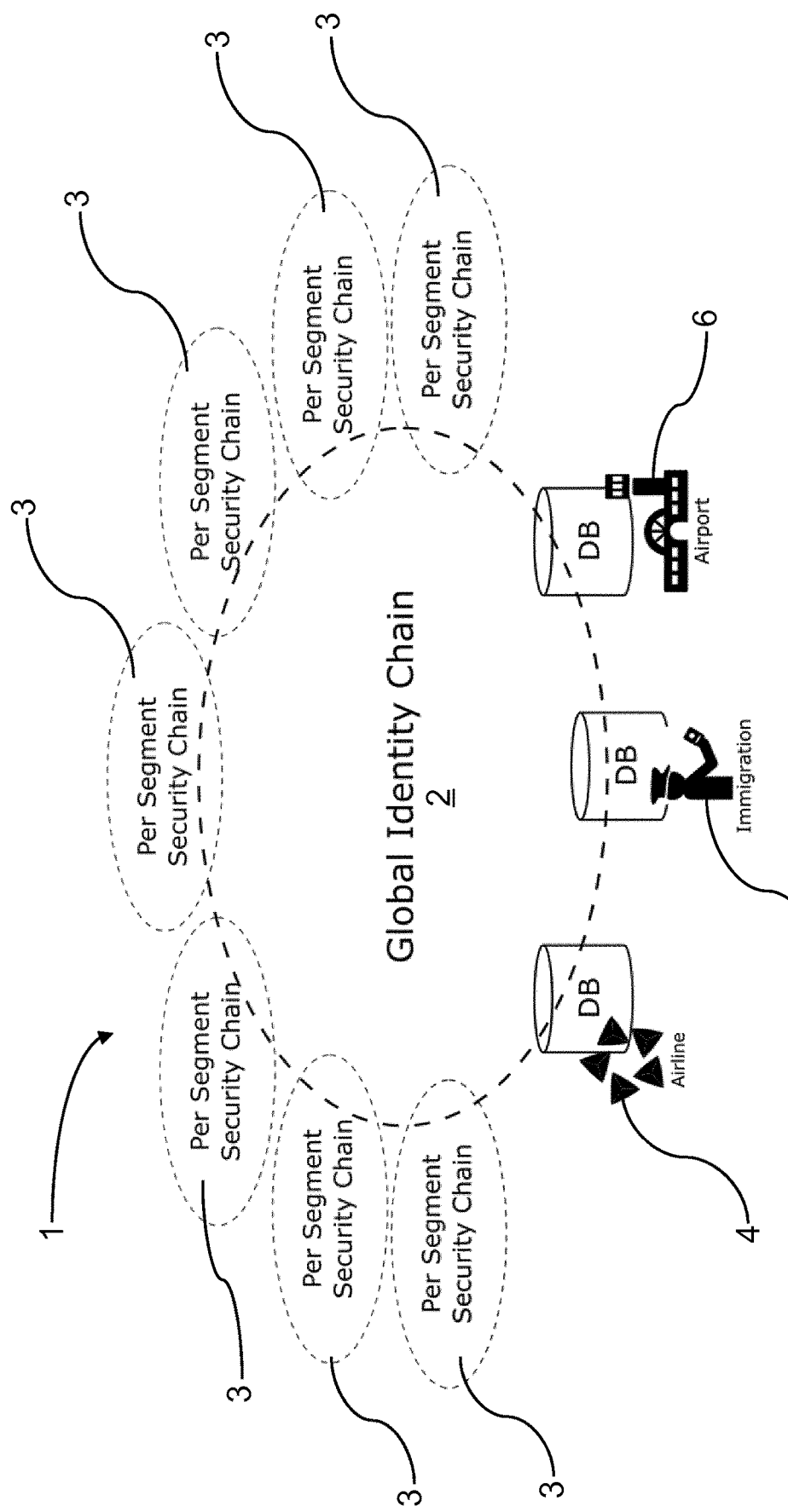
FIG. 1 is a schematic view illustrating an overview of an architecture of a method or a system in accordance with an embodiment.

The present disclosure provides an improved and further developed method for supporting identity management of travelers in an airport in such a way that the efficiency of airport security processes is improved.

In accordance with the present disclosure, a method is provided for supporting identity management of travelers in an airport using a distributed ledger system, wherein the distributed ledger system includes a global identity blockchain and several security blockchains, wherein the global identity blockchain is accessible by entities of the distributed ledger system, and wherein a security blockchain is employed for a predetermined flight segment, such that the security blockchain is accessible only by entities of the distributed ledger system that are involved in the predetermined flight segment. The method includes receiving, by the global identity blockchain, a registration request from a traveler via a traveler device, wherein the registration request includes a commitment for identity data that is uploaded by the traveler in a secure cloud storage, and wherein said commitment is recorded in the global identity blockchain, receiving, by the global identity blockchain, a result of an identity verification with respect to the traveler from a verifier entity, wherein said result is recorded in the global identity blockchain, receiving, by the security blockchain, a ticket registration transaction that is issued by an airline entity, wherein the ticket registration transaction comprise a unique traveler ID of the traveler, and issuing, by the security blockchain, an access control list update upon reception of consent by the traveler in order to allow one or more entities to have access to the identity data of the traveler stored in the secure cloud storage.

Furthermore, a distributed ledger system is provided for supporting identity management of travelers in an airport, wherein the distributed ledger system comprises several entities that are interconnected via blockchain technology, wherein the distributed ledger system includes a global identity blockchain and several security blockchains, wherein the global identity blockchain is configured to be accessible by entities of the distributed ledger system, wherein a security blockchain is configured to be employed for a predetermined flight segment, such that the security blockchain is accessible only by entities of the distributed ledger system that are involved in the predetermined flight segment, wherein the global identity blockchain is configured to receive a registration request from a traveler via a traveler device, wherein the registration request includes a commitment for identity data that is uploaded by the traveler in a secure cloud storage, and wherein said commitment is recorded in the global identity blockchain, wherein the global identity blockchain is configured to receive a result of an identity verification with respect to the traveler from a verifier entity, wherein said result is recorded in the global identity blockchain, wherein the security blockchain is configured to receive a ticket registration transaction that is issued by an airline entity, wherein the ticket registration transaction comprise a unique traveler ID of the traveler, and wherein the security blockchain is configured to issue an access control list update upon reception of consent by the traveler in order to allow one or more entities to have access to the identity data of the traveler stored in the secure cloud storage.

According to the present disclosure, it has first been recognized that an enormous improvement with regard to the efficiency of travelers' identities verification can be achieved by leveraging blockchain technology between main entities/participants of the air travel security. According to the disclosure, a distributed ledger system is used, wherein the distributed ledger system includes a global identity blockchain and several security blockchains. The global identity blockchain is accessible by all entities/participants of the distributed ledger system. With regard to the security blockchains, a security blockchain is employed for a predetermined flight segment, wherein the security blockchain is accessible only by entities that are involved in the predetermined flight segment. Taken this configuration into consideration, the blockchains are configured and employed as follows: The global identity blockchain is configured to receive a registration request from a traveler via a traveler device. The registration request includes a commitment for identity data of the traveler that is uploaded by the traveler in a secure cloud storage. The commitment is stored on the global identity blockchain. The global identity blockchain is further configured to receive a result of an identity verification with respect to the traveler from a verifier entity, wherein the result is also stored on the global identity blockchain. The security blockchain is configured to receive a ticket registration transaction that is issued by an airline entity, wherein the ticket registration transaction comprises a unique traveler ID of the traveler. The security blockchain is further configured to issue an access control list (ACL) update upon reception of consent by the traveler in order to allow one or more entities to have access to the identity data of the traveler stored in the secure cloud storage.

Thus, embodiments of the present disclosure provide a new smart airport procedure that improves the efficiency of travelers' identities verification. In this regard, the outcome of embodiments may be twofold:
  i) to improve the security of airports by sharing important data on travelers between the different organizations/entities involved in the process;
  ii) to reduce the time it takes for travelers between arrivals at the airport until boarding the plane.

Furthermore, it is mentioned that the steps of a method may be performed in different order. In other words, various sequences of the method steps and/or repetitions of the steps may be possible.

Embodiments leverage the blockchain for data sharing and biometric devices for faster travelers' identification. Hence, embodiments enable seamless travel experience for passengers/travelers in airports while tightening security and enabling quick information sharing between agencies.

The terms "entity", "verifier entity", "airline entity", "airport entity" and "immigration department entity" refer in particular in the claims, preferably in the specification, each to a device adapted to perform computing like a personal computer, a tablet, a mobile phone, a server, or the like and comprises one or more processors having one or more cores and may be connectable to a memory for storing one or more applications which is/are adapted to perform corresponding steps of one or more of the embodiments. Any application may be software-based and/or hardware-based installed in the memory on which the processor(s) can work on. The devices, entities or the like may be adapted in such a way that the corresponding steps to be computed are performed in an optimized way. For instance different steps may be performed in parallel with a single processor on different of its cores. Further the entities may be identical forming a single computing device. The device or devices may also be instantiated as a virtual device running on a physical computing resource. Different devices may therefore be executed on said physical computing resource. In other words the above mentioned terms of "entity" are each to be understood as any kind of physical or virtual computing entity or computing entities and may include, but are not limited to the following: an application running on a computer, a microprocessor, a single, dual, quad or octa-core processor or processors or the like or a computer, processor, or the like with a memory. Said application, computer or processor may have one or more interfaces, ports or the like for communication with other devices, entities, ports, interfaces or the like.

The term "transaction" is to be understood in the most general sense and refers in particular in the claims, preferably in the specification to information sent or transmitted into the network, e.g. to nodes connected to the node sending said transaction. Said transaction may be provided in form of a message, a data packet or the like and may comprise information for the recipients of said transaction.

The term "blockchain" may be understood, in particular in the claims, preferably in the description as a distributed database maintaining a continuously growing list of data records that are hardened against tampering and revision even by operators of the data storing nodes hosting database. A blockchain comprises for example two kinds of records: so-called transactions and so-called blocks. Transactions may be the actual data to be stored in the blockchain and blocks may be records confirming when and in what sequence certain transactions became journaled as a part of the blockchain database. Transactions may be created by participants and blocks may be created by users who may use specialized software or equipment designed specifically to create blocks. The term "blockchain" is e.g. identical to the Bitcoin blockchain as a digital currency was introduced in 2008.

According to embodiments, a security blockchain may rely on the global identity blockchain for the management of the travelers' identity: travelers are only required to register once on the global identity blockchain. Then, e.g. upon a ticket registration transaction, a security chain can retrieve the traveler's registration from the global identity chain in order to ensure that the traveler ID is a correct ID and to retrieve the public key of said traveler for further verification of traveler's signatures. Different security chains may also exchange information through asset transfer, for example, as described in the non-patent literature of Li, A. Sforzin, S. Fedorov and G. O. Karame, "Towards scalable and private industrial blockchains" in Proceedings of the ACM Workshop on Blockchain, Cryptocurrencies and Contracts, 2017. Further, it may be provided that this can also be used to share data from a security chain to the global identity chain.

According to embodiments, the ticket registration transaction may comprise time information about the period in which the traveler is traveling. Thus, the traveler's time of journey may be provided and considered in data processing steps for embodiments. For example, the time of journey may be employed for implementing time-dependent access to the identity data and/or ticket data of the traveler, which is uploaded and stored in the secure cloud storage.

According to embodiments, the ticket registration transaction may include a consent information of the traveler with respect to the usage of the traveler's data that is stored in the secure cloud storage, such that potential data privacy issues may be avoided. The traveler's data stored in the secure cloud storage may include but not limited to uploaded identity data or purchased flight tickets.

According to embodiments, it may be provided that the secure cloud storage may comprise one or more cloud databases. The secure cloud storage solution can includes multiple cloud storage providers, such as, e.g., AWS, Azure, Google Cloud, and NEC Cloud. The cloud services used by the cloud storage may provide an Access Control List (ACL) for each file that contains the list of entities of the distributed ledger system and/or of further third parties that are allowed to read it. According to the embodiment, all cloud services may have access to a blockchain client that is connected to the different security blockchains, which, upon instruction to do so from those chain, grants access to the entities of the distributed ledger system and/or further third parties to the data of the users/travelers. This process is expected to be automatized. The traveler's consent with respect to the usage of his data stored in the secure cloud storage may be received by the security blockchain via signaling messages and/or one or more transactions. Upon reception of traveler's consent, the security blockchain can issue an access control list update to the cloud services.

According to embodiments, the identity data may comprise a passport of the traveler and biometric data of the traveler. Thus, passport and biometric data are uploaded by the traveler in a secure cloud storage during the registration process. Due to the biometric data, the identity of the traveler can be verified using unique personal physical characteristics of the traveler. For example, the biometric data may comprise face biometric data of the traveler. Furthermore, e.g., the biometric data may include a fingerprint of the traveler. The biometric data can be provided in the form of a picture (image), which is uploaded in the secure cloud storage.

According to embodiments, the identity verification may include performing a passport validation, wherein the traveler grants a verifier entity access to the passport that is stored in the secure cloud storage. The verifier entity checks authenticity and validity of the stored passport, and issues a passport validation transaction to the global identity blockchain, if the passport validation succeeds. Thus, the outcome of the passport validation may efficiently considered and used by other entities without the need of performing another validation.

According to embodiments, it may be provided that a verifier entity is able to read-only the traveler's identity data in the secure cloud storage in order to prevent sensitive data leakage.

According to embodiments, a matching engine may be provided, wherein the matching engine has access to biometric data of travelers that is stored in the secure cloud storage. The matching engine is configured to carry out biometric matching upon request by an entity of the distributed ledger system. Thus, it may be provided that the biometric data such as face biometrics will be stored on each traveler's secure cloud storage and the matching engine may be a computational engine in the cloud. The matching engine may get the data directly from the secure cloud services and only load data from travelers that gave consent to the usage of their data. Further, by using the matching engine, it can be avoided that entities such as a verifier entity, airport entity and/or airline entity needs direct access to the biometric data of the traveler, which is stored in the secure cloud storage.

According to embodiments, the matching engine may provide an authenticate access programming interface (API), wherein the authenticate API takes as input a travelers gallery and a picture (image) of a traveler, and wherein the authenticate API outputs the unique traveler ID of the traveler. Thus, identity verification's efficiency can be improved through face recognition software. Since 1 to N matching (finding the identity of someone through his face in a list of identities) loses efficiency and accuracy as N grows, the airport entity may build a "gallery" (i.e. the travelers gallery) that will contain only the biometric data, in particular the face biometrics, of the travelers, e.g., of the current day—even though many more might be registered. Thus, a gallery may be defined as being a list of traveler's biometric data. For example, a gallery might be defined as being a list of traveler's face biometric data. The face biometric of the travelers can be retrieved from the secure cloud storage—upon consent granted by the respective travelers—and aggregated to create the travelers gallery. Then, when a traveler needs to be authenticated, his face is captured and sent to the matching engine. Thus, a 1 to N matching can be used to identify the traveler, wherein N represents the travelers gallery.

According to embodiments, the matching engine may provide a validate access programming interface (API), wherein the validate API takes as input the unique traveler ID of the traveler and a picture (image) of the traveler, and wherein the validate API outputs true or false depending on whether the picture (image) includes the same person as the biometric data that has been uploaded in the secure cloud storage by the traveler ID. If the validate API returns true, it may also return a signed message containing the ID of the traveler (i.e. the traveler ID) and the biometric data commitment, in particular the face commitment. Thus, a 1 to 1 matching—where the ID of the traveler is given—can be used during an identity verification (after registration) of the traveler to make sure that the traveler uploaded a correct picture of his face and/or other biometric data.

According to embodiments, the identity verification may include performing a face biometric validation, wherein the traveler grants the matching engine access to the biometric data that is stored in the secure cloud storage. A verifier entity checks an identity of the traveler using the passport that is shown by the traveler during a video call or during a check-in at the airport. The verifier entity additionally takes a picture of the traveler during the video call or during the check-in at the airport. Then, the verifier entity can issue a validate query to the matching engine by providing the traveler ID and the taken picture as input for the validate API of the matching engine. Thus, the face biometric data of traveler can be efficiently checked and validated.

According to embodiments, it may be provided that, upon the face biometric validation is completed, the verifier entity issues an identity validation transaction to the global identity blockchain. Thus, the outcome of the identity validation with respect to the biometric data can be efficiently considered and used by other entities of the distributed ledger system without the need of performing another validation.

According to embodiments, the security blockchain may record an outcome of a pre-checking process. The pre-checking process may include an online check-in and a pre-screening of the traveler, such that the pre-checking process is performed and employed by an immigration department entity to verify that the traveler is allowed to travel and that the identity data of the traveler is valid.

According to embodiments, the immigration department entity may issue a pre-screening transaction to the security blockchain in order to record the outcome of the pre-checking process in the security blockchain of the flight segment of the traveler. Thus, the result of this pre-screening is stored in the security blockchain by issuing a pre-screening transaction that is broadcasted into the security chain of the corresponding flight segment. If the pre-screening fails, the traveler is not allowed to pass through any security check and/or checkpoint at the airport.

According to embodiments, it may be provided that the immigration department entity does not have direct access to the traveler's passport that is stored in the secure cloud storage, but only a rendered image sufficient to find a match in the internal database of the immigration department entity. Thus, the immigration department entity can read-only the traveler's identity data information in order to prevent sensitive data leakage.

According to embodiments, the security blockchain may create a list of traveler IDs of travelers traveling in a predetermined time period. For example, the security blockchain may create a list of traveler IDs of travelers traveling each day. The airport entity can then query this list from all the security blockchains they are part of in order to create a travelers gallery and sends it to the matching engine. By doing this, the gallery may be used for the face biometric matching, and makes the process more efficient.

According to embodiments, the security blockchain may record a passage of the traveler through checkpoints of the airport such that the current path of the traveler is recorded and tracked in the airport. For example, checkpoints may include check-in, baggage drop, security inspection, border control and/or boarding. Thus, it can be supported and implemented that only authorized persons (such as, e.g., travelers, pilots, airport employees) can navigate freely in the airport.

Embodiments may improve the whole process of identity management of travelers in an airport by combining three technologies: blockchain, secure cloud storage and state of the art biometric recognition (fingerprint, face recognition, etc.).

According to embodiments, the blockchain technology may be used in order to ensure a synchronized database between all the required participants/entities that will provide them with a consistent view of the entire system, as well as to track the current position of every passenger/traveler. The blockchain may record every time a passenger/traveler passes a checkpoint until the traveler exits the destination's airport.

According to embodiments, the secure cloud storage solution can securely store travelers' identities and biometric data that third parties can access (read-only) after the travelers grant them permission to do so.

Furthermore, according to embodiments, biometrics devices can make sure that only the authorized persons (such as travelers, pilots, airport employees) can navigate freely in the airport. Since the current path of the travelers is recorded and tracked, embodiments also improve the management of delayed and canceled flights.

Embodiments describe a method and a distributed ledger system that can make a traveler's journey through airport security more efficient, secure, and less error prone. In this regard, embodiments may implement a technology including permissioned blockchain, smart contracts, secure cloud storage and face recognition as follows:

1. Permissioned Blockchain

To solve the problem of database inconsistencies, embodiments can use a blockchain between all the main participants of the air travel security. Since the data shared between those participants/entities should not be available to external parties, embodiments may use the concept of permissioned blockchain.

A permissioned blockchain is a software that runs between multiple allowed entities and provides a common view on a set of data. Since the blockchain is permissioned, there is an enrolment process in place, and only successfully enrolled entities are able to join the network (i.e. the distributed ledger system), exchange transactions, and see the data on the blockchain.

Blockchains provide an immutable history of transactions, making it impossible to tamper with the data that they store. Since data would be available to all the participants of the distributed ledger system, the travelers' sensitive data is not stored directly in the blockchain; instead, a secure cloud storage service that provides data privacy is used, and simply a commitment of files' metadata is stored in the blockchain.

Embodiments may leverage a blockchain architecture as described in the non-patent literature of Li, A. Sforzin, S. Fedorov and G. O. Karame, "Towards scalable and private industrial blockchains" in Proceedings of the ACM Workshop on Blockchain, Cryptocurrencies and Contracts, 2017. This blockchain architecture provides better performances than any of its permission-based blockchain competitors in both throughput (up to 100,000 transactions per second with 200 different companies) and scalability. It provides support for IoT devices, providing full security for resource constrained devices that do not have the hardware required to maintain a full blockchain node. This architecture also provides a higher degree of privacy thanks to a technology called satellite chains as may be obtained from the aforementioned document. Satellite chains are small, independent sub-chains with their own ledgers, smart contracts, consensus algorithm, and participants. However, they are still allowed to communicate and transfer assets with each other if needed, while still maintaining their independence. Concretely, a satellite chain runs its own blockchain and thus provides the same performances as the main chain. These satellite chains may be used as security blockchains for embodiments.

The blockchain architecture as described in Li, A. Sforzin, S. Fedorov and G. O. Karame, "Towards scalable and private industrial blockchains" in Proceedings of the ACM Workshop on Blockchain, Cryptocurrencies and Contracts, 2017 is fully compatible with the open source software Hyperledger fabric and it provides the same smart contract capabilities. The open source software Hyperledger is described in the non-patent literature of Androulaki, A. Barger, V. Bortnikov, C. Cachin, K. Christidis, A. De Caro, D. Enyeart, C. Ferris, G. Laventman, Y. Manevich, S. Muralidharan, C. Murthy, B. Nguyen and M. Sethi, "Hyperledger fabric: a distributed operating system for permissioned blockchains" in Proceedings of the Thirteenth EuroSys Conference, 2018.

2. Smart Contracts

A blockchain also provides smart contracts capabilities. Smart contracts are pieces of software that run on the blockchain and provide an interface to interact with the data. Smart contracts are typically enforced by the nodes/entities of the distributed ledger system. It is not possible for a single entity to bypass the rules defined by a smart contract, since it would require the agreement of the majority of the participants.

The main advantage of smart contracts is that they can automate an organization's business logic. In turn, the switch to automation cancels the effects of human errors and misunderstandings that may lead to legal disputes. A legal contract or a law might be subject to personal interpretations, but software is deterministic; there is no room for subjective interpretations. Smart contracts can be typically issued by any entity in the system, but technology implemented for embodiments may empower only a subset of entities to issue smart contracts in the distributed ledger system.

3. Secure Cloud Storage

A secure cloud storage service stores travelers' identity data and travel information, such as valid passports, biometric information, entry VISAs, flight tickets, hotel bookings, and so on. Travelers are in charge of granting read permissions to their personal data to all third parties wishing to access it to complete the identity verification process. The data stored in the secure cloud storage is completely private and cannot be inspected even by the cloud services. The secure cloud storage solution requires the usage of multiple cloud storage providers, such as, e.g., Microsoft Azure, AWS (Amazon Web Services), and NEC Cloud.

4. Face Recognition

Identity verification's efficiency can be improved through face recognition software. In order to achieve efficient face recognition, the face biometric of each traveler is to be collected and stored in a database. Since 1 to N matching (finding the identity of someone through his face in a list of identities) loses efficiency and accuracy as N grows. Thus, according to embodiments the airport may build a "gallery" that will contain only the face biometrics of the travelers of a predetermined time period, e.g. of the current day, even though many more might be registered. According to embodiments, a gallery may be defined as being a list of user's face biometric.

The matching engine is a computational engine with access to a database of face biometrics that provides an authenticate API (Application Programming Interface) and a validate API. The authenticate API takes as input a gallery ID and an image of a traveler and outputs the traveler ID (TID) of the traveler, while the validate API takes as input the TID of the traveler and an image of the traveler and outputs true or false depending on whether it is a match or not. If the validate API returns true, it also returns a signed message containing the TID of the traveler and the face commitment.

According to embodiments, the face biometrics may be stored on each traveler's secure cloud storage and the matching engine is a computational engine in the cloud. The matching engine may get the data directly from the secure cloud services and will only load data from travelers that gave consent to the usage of their data.

Hence, embodiments may provide the following:

Leveraging the concept of satellite chain as described in the non-patent literature of Li, A. Sforzin, S. Fedorov and G. O. Karame, "Towards scalable and private industrial blockchains" in Proceedings of the ACM Workshop on Blockchain, Cryptocurrencies and Contracts, 2017, to separate travelers' identity management and airport security information sharing layers. The identity management layer may comprise a single global identity blockchain that all the system's participants join. The security information sharing layer is comprised of multiple, independent, blockchains in which entities involved in a flight route/segment share information about travelers traveling that route/segment in any given day.

Combining secure cloud storage, face recognition, and blockchain technologies to securely manage traveler's identities. The system fetches information from the cloud storage, instructs the face recognition engines to carry out biometric matching, and reaches consensus over granting or denying access to travelers at any point in time.

There are several ways how to design and further develop the teaching of the present disclosure in an advantageous way. To this end it is to be referred to the claims and to the following explanation of further embodiments illustrated by the figures.

FIG. 1 shows a schematic view illustrating an overview of an architecture of a method or a system in accordance with an embodiment. FIG. 1 illustrates a distributed ledger system 1 for supporting identity management of travelers in an airport. The distributed ledger system 1 includes a "global identity chain" 2 as global identity blockchain and several "per segment security chains" 3 as security blockchains. Furthermore, FIG. 1 shows databases of entities participating in the distributed ledger system 1. The entities include an airline entity 4, an immigration department entity 5 and an airport entity 6. The airline entity 4, the immigration department entity 5 and the airport entity have their own databases DB.

The global identity chain 2 is accessible by entities of the distributed ledger system 1. A per segment security chain 3 is employed for a predetermined flight segment, such that the security blockchain is accessible only by entities of the distributed ledger system network that are involved in the predetermined flight segment.

An embodiment as illustrated by FIG. 1 may include the following components in order to form a distributed ledger system:

1. User Application

A user software application, deployable in mobile devices as traveler devices, acts as the traveler's interface to the distributed ledger system 1, allowing the traveler to register to the system, book flights, query the status of his travel, and show notifications about important updates regarding his travel.

Upon installation, the application generates a unique key pair (sk, pk) that from now identifies the traveler in the distributed ledger system 1. The unique key pair may be employed to generate a unique traveler ID (TID) for the traveler. The TID may be a unique character string or number. For example, the traveler ID (TID) might be extracted from the traveler's public key, e.g., by hashing the public key and taking the first 10 bytes.

2. Global Identity Chain

The global identity chain 2, or identity chain, is the main system's chain. Within a distributed ledger system architecture based on satellite chains as described in Li, A. Sforzin, S. Fedorov and G. O. Karame, "Towards scalable and private industrial blockchains" in Proceedings of the ACM Workshop on Blockchain, Cryptocurrencies and Contracts, 2017, the global identity chain can be considered the main blockchain. Its purpose is to record information about new travelers. In particular, it records in the shared ledger the commitment of the traveler's identity data uploaded in the secure cloud storage at registration time. The commitment ensures that every entity accessing the traveler's data reads the same version of the document. Additionally, the global identity chain 2 stores transactions asserting the validity of a travelers' identity.

Every actor in the distributed ledger system 1 has access to the global identity chain 2, with travelers and external service providers (such as, hotel chain, car rentals, and so on) being light client able to query and receive notifications.

3. Per Segment Security Chain

According to the embodiment of FIG. 1, one per segment security chain 3 is envisioned per flight route or segment. The shared ledger of a per segment security chain 3 is used to store information related to travelers' trips, such as flight tickets and the outcome of each (security) checkpoint that any given traveler went through.

The per segment security chain 3 can be used by airlines, airports, and governments so that they can efficiently share information related to travelers, and the results of their identity checks. With this knowledge, threats could be efficiently prevented by keeping an eye on, or completely blocking, travelers whose identity checks failed at one (or more) checkpoints.

The per segment security chain 3 also comprises an Access Control List (ACL) management smart contract that issues events to the secure cloud services to update the ACL of the traveler's file. The ACL management smart contract verifies that the user (traveler) gave consent to having his data processed and that the data has to be processed for the flight before granting read access. The secure cloud storage nodes have to subscribe to the ACL update of all the per segment security chains 3 in order to grant read access to the entities when required.

As shown in FIG. 1, the global architecture of the distributed ledger system 1 comprises one global identity blockchain 2 where all the users will be registered as well as one security blockchain per flight segment. The virtual database of the global identity chain 2 may only contain some part of the database of each participant and mainly contain commitment of data. Each entity may still keep an internal database containing the information it needs.

4. Transactions Format

Several transactions are exchanged in a distributed ledger system according to the embodiment of FIG. 1. For example, the format of the blockchain transactions exchanged in accordance with embodiments of the distributed ledger system, as well as the blockchain in which they are sent, may be listed as follows:

<Pubkey|commitments{[commit$_{doc1}$, commit$_{doc2}$, . . . , commit$_{docn}$]}|sig>    Registration transaction where Pubkey is the public key generated by the user application, commitments{ . . . } is a list of the file commitments of a traveler, and sig is the traveler's digital signature that provides authenticity and integrity of the previous field. The user app creates this transaction during the Registration step and broadcasts it into the global identity chain.

<TID|commitment{passport}|sig>    Passport validation transaction where TID is the unique Traveler ID, commitment{ . . . } is the traveler passport's commitment, and sig is the signature of the verifying company (i.e. the verifier entity). An identity verifier creates this transaction during the Identity Validation step and broadcasts it into the global identity chain.

<TID, commitment{face}|validation outcome|sig>    Identity validation transaction where TID is the unique Traveler ID, commitment{ . . . } is the traveler's face photo commitment, validation outcome is the signed message from the matching engine, and sig is the signature of the verifier. An identity verifier creates this transaction during the Identity Validation step and broadcasts it into the global identity chain.

<TID, ticket ID|day(s) of travel|sig>    User consent transaction where TID is the unique Traveler ID, ticket ID is the newly bought ticket's unique ID, day(s) of travel is the days in which the traveler is traveling, and sig is the traveler's signature. The user app creates this transaction during the Ticket Purchase step and sends it off-chain to the airline from which the traveler bought the ticket.

<user consent transaction|extras{ . . . }|sig>    Ticket registration transaction where extras{ . . . } stores additional information on the travel that can be required by the destination's immigration department, for example a visa, a receipt of a hotel in the foreign country, or a proof of return flight; user consent transaction is the user consent transaction that the user application sent to the airline, and sig is the airline's digital signature. The airline creates this transaction during the Ticket Purchase step and broadcasts it into the per segment security chain.

<Ticket ID|TID|pre-screening outcome|sig>    Pre-screening transaction where ticket ID is the newly bought ticket's unique ID, TID is the unique Traveler ID, pre-screening outcome reports the outcome of the traveler's identity pre-screening, and sig is the immigration's department signature. An immigration department creates this transaction during the Online Check-in and Pre-screening step and broadcasts it into the per segment security chain.

FIG. 2 to FIG. 7 show schematic views illustrating major steps of embodiments.

Figure 2:
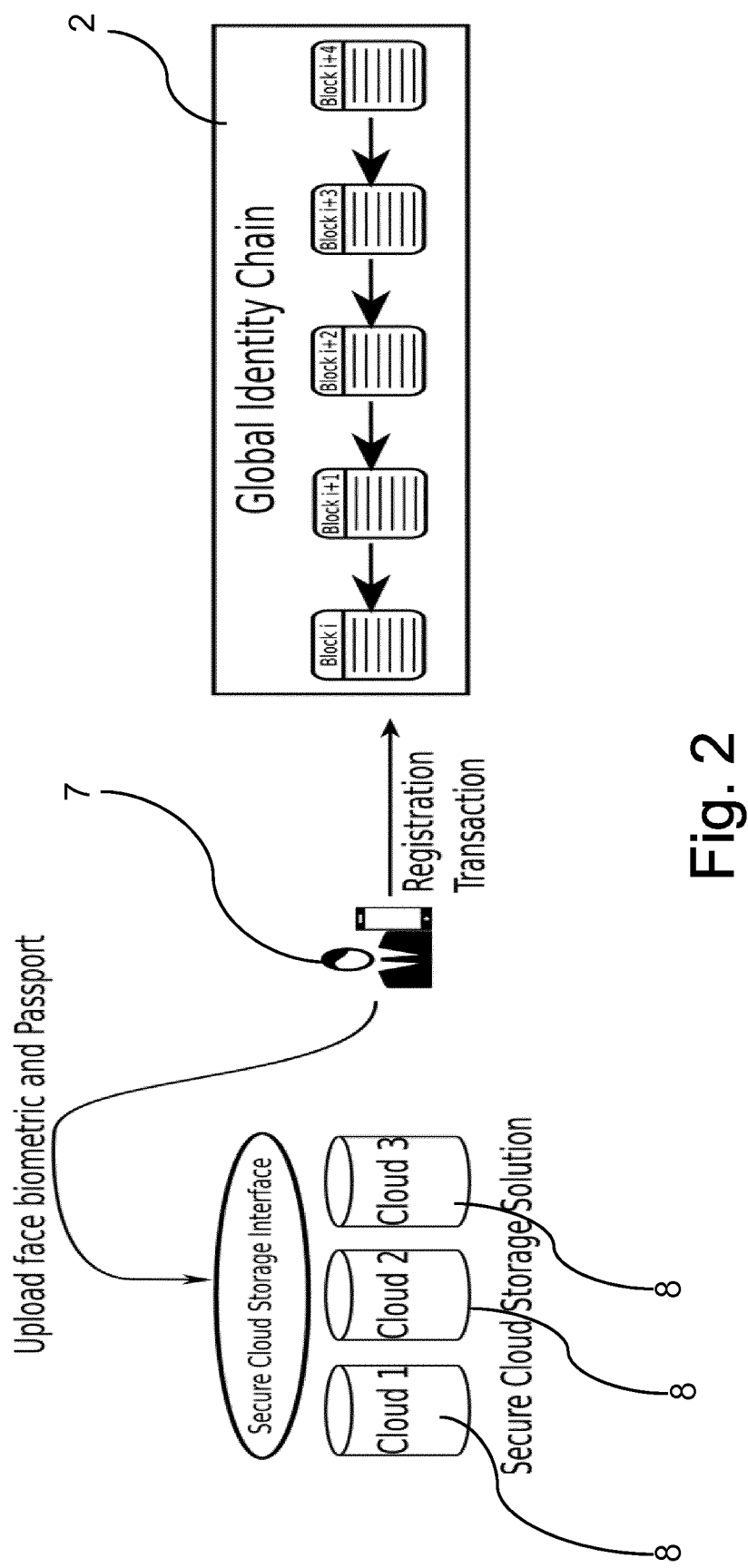
FIG. 2 is a schematic view illustrating a registration process of a traveler in accordance with an embodiment.

FIG. 2 shows a schematic view illustrating a registration process of a traveler 7 in accordance with an embodiment.

Registration

The prospective traveler 7 has to register himself to the distributed ledger system in order to be able to purchase a flight ticket. This entails uploading his biometric data as well as his passport to the secure cloud storage.

The registration process, as shown in FIG. 2, begins with the traveler's user application creating a list of commitments for the traveler's identity data. For example, a commitment in this case may simply be a randomized hash. Subsequently, the traveler issues a registration transaction in the global identity chain 2, where a smart contract records the commitments in the shared ledger and extracts a Traveler ID (TID) from the traveler's public key (e.g., by hashing the public key and taking the first 10 bytes). The commitment ensures that every entity accessing the traveler's data reads the same version of the document. Finally, the traveler 7 then uploads the documents and face biometric data to the secure cloud storage, using his private key to authenticate.

User's Consent

The blockchain manages the access to the user's data in the secure cloud storage solution. The secure cloud storage solution is a secure cloud storage that may comprise one or more cloud databases 8 and is accessible via a secure cloud storage interface. The secure cloud storage solution can include the usage of multiple cloud storage providers, such as, e.g., Microsoft Azure, AWS (Amazon Web Services), and NEC Cloud. The cloud service of the secure cloud storage provides an Access Control List (ACL) for each file that lists all the third parties that have the required permissions to read it. In an embodiment, all cloud services may have access to a blockchain client, which, upon instruction to do so from the blockchain, grants access to third parties to the data stored in the cloud. This process is expected to be mostly automated. Upon buying a ticket, a traveler agrees that his information will be shared with the airline entity, the airport (security) entities, and the immigration's office entities of both departure and destination airports for the duration of his travel.

Figure 3:
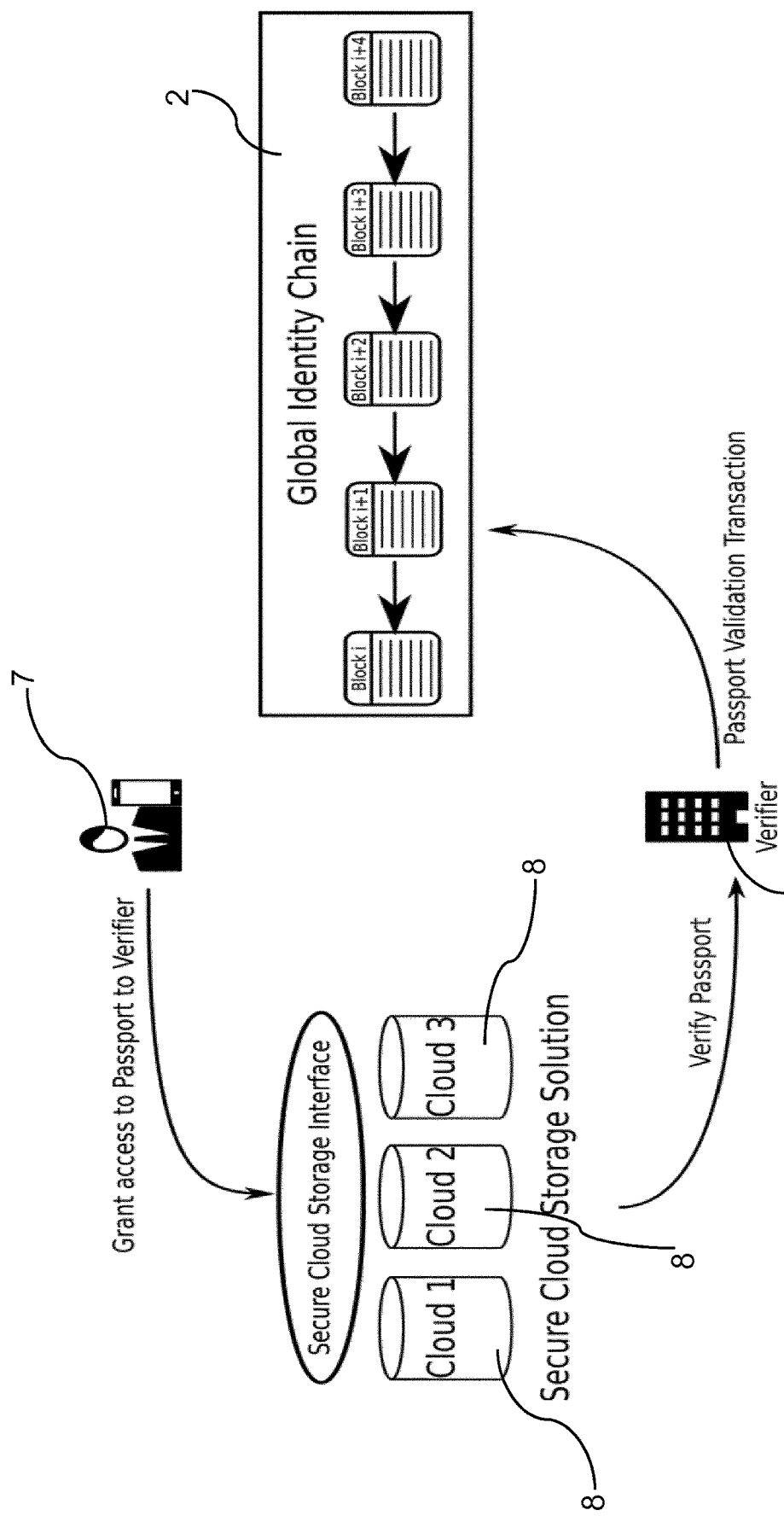
FIG. 3 is a schematic view illustrating a traveler's identity validation process in accordance with an embodiment.
Figure 4:
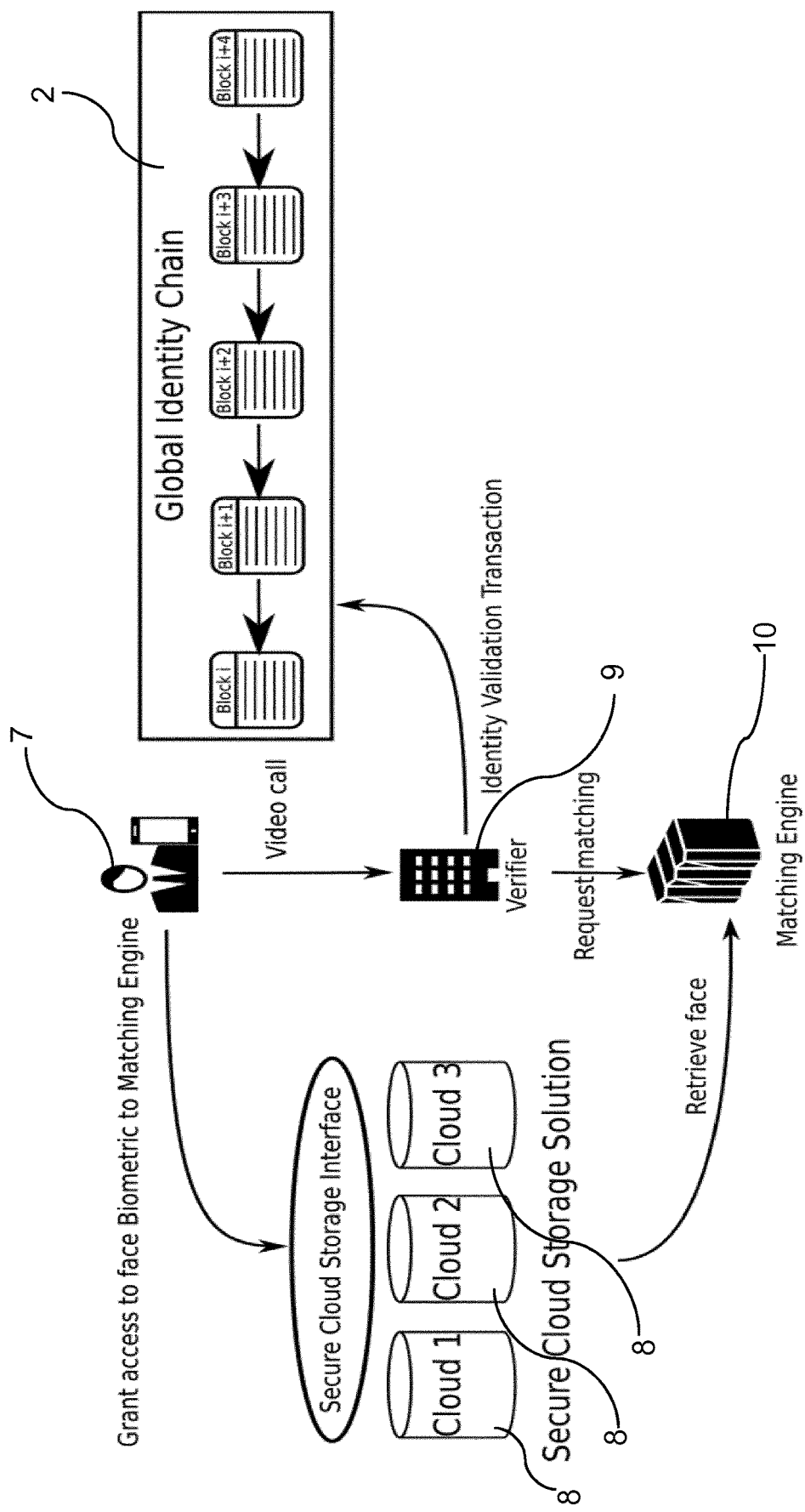
FIG. 4 is a schematic view illustrating a traveler's face biometric verification process in accordance with an embodiment.

FIG. 3 shows a schematic view illustrating a traveler's identity validation process in accordance with an embodiment. FIG. 4 shows a schematic view illustrating a traveler's face biometric verification process in accordance with an embodiment.

Identity Validation

The registration process guarantees only that the new user (traveler 7) is registered to the system. To confirm the registration and allow the traveler 7 to use and take full advantage of the distributed ledger system, the identity data that were uploaded at registration time must be validated, as exemplarily illustrated in FIG. 3 and FIG. 4.

An online verifier entity 9 asynchronously validates the traveler's passport. The verifying company checks the authenticity and validity of the document. If the validation succeeds, the verifier entity 9 issues a passport validation transaction to the global identity chain 2. In order to prevent sensitive data leakage, the verifier entity 9 does not download the document; it only sees an image of it.

The validation of the face biometric can be done through a video call or at check-in in the airport.

In the case of validation via video call, the traveler 7 has to do a short video call in during which he shows his passport to validate his identity. To verify the face biometric data, the verifier entity 9 issues a validate query ("Request matching") to the matching engine 10 by providing the traveler's TID and a picture taken during the live call as the query's arguments. If the matching engine is unable to find a match, the validation fails and is stopped. Otherwise, the validation is successful and the traveler's face biometric data is linked to his TID.

In case of validation during a check-in at the airport, the traveler has to present his passport at a check-in desk where the airline verifies that the traveler is the passport's rightful owner and the passport stored in the cloud is the same as the one presented. To do so, check-in desk's face scanner takes a picture of the traveler's face and issues a validation query to the matching engine together with the traveler's TID and the picture just taken. If the face matching engine is unable to find a match, but the check-in desk determines that the traveler is the rightful owner of the passport, the latter uploads a new picture for the traveler on the secure cloud storage and requests the user application of the traveler to update the commitment.

Once the verification is successfully completed, the verifier entity 9 issues an identity validation transaction in the global identity blockchain. A smart contract checks the signatures and ascertains that the verifier entity 9 was an authorized verifier before recording the face biometric data commitment in the shared ledger.

In both cases (passport and face biometric data) the verifying entity 9 is liable for the verification process, since unforgeable signature are used by an embodiment. The validation step may be one-time-only: the traveler 7 will not have to go through this validation step in future travels.

Further, it is noted that it may be possible to define stricter security requirements via the identity chain smart contract, such as requiring that at least two (or more) independent entities perform the identity validation process.

Figure 5:
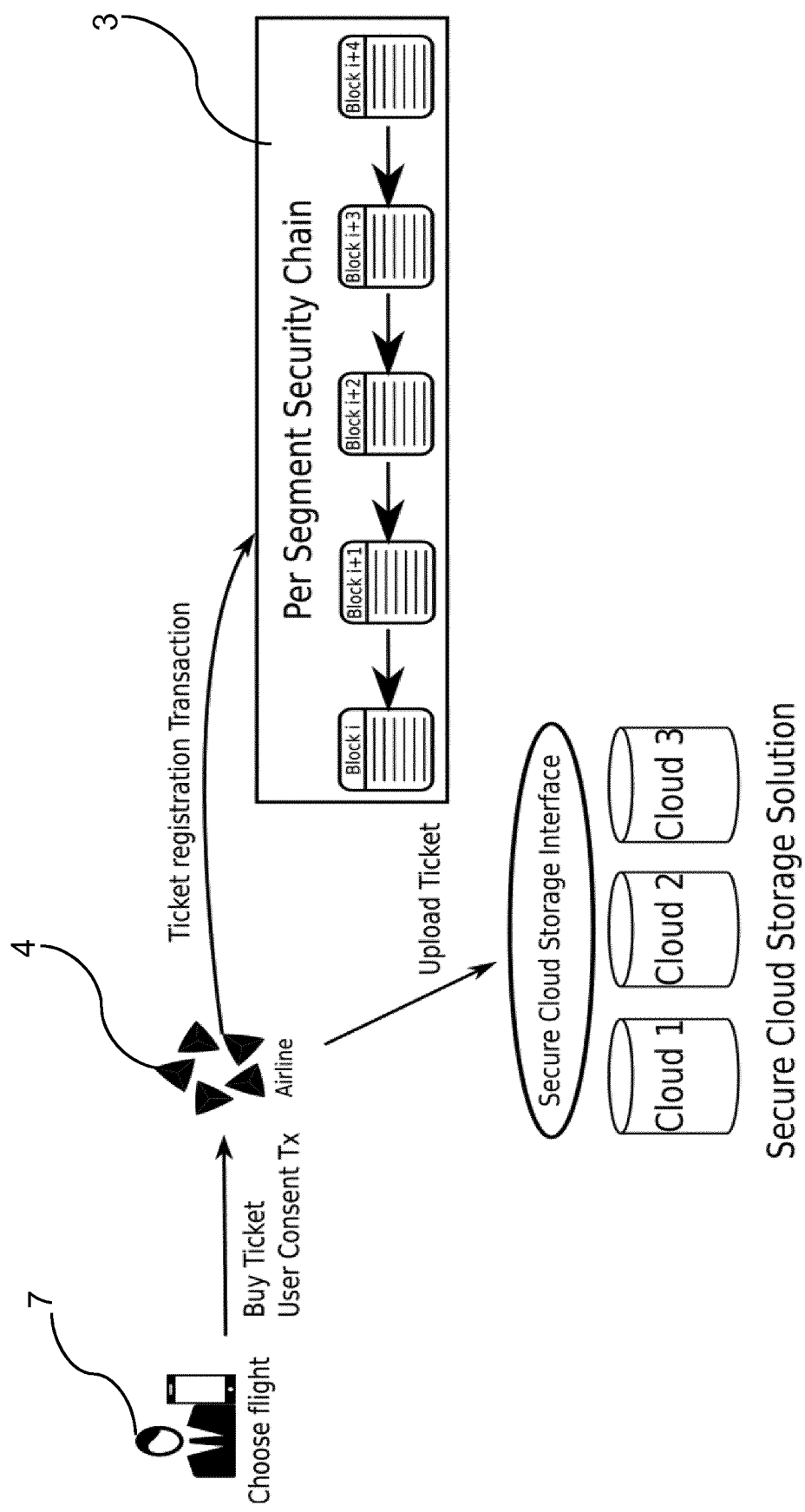
FIG. 5 is a schematic view illustrating a ticket purchase process in accordance with an embodiment.

FIG. 5 shows a schematic view illustrating a ticket purchase process in accordance with an embodiment.

Ticket Purchase

The user application of the traveler 7 allows for purchasing flight tickets issued by airline entities that are part of the distributed ledger system, as exemplary illustrated in FIG. 5.

Once the traveler 7 books a flight via a traveler device, the user application asks for the traveler's consent to have his data stored in the secure cloud storage accessed by third parties. Upon agreement, the user application sends (off-chain) a user consent transaction ("User consent Tx") to the appropriate airline entity 4. The traveler's consent to access his data is valid for the duration of his travel. Since the traveler 7 signs it, the transaction acts as a proof that the traveler 7 indeed granted access to his data for the duration of his travel.

The airline entity 4 then uploads the ticket to the secure cloud storage solution, i.e. to the secure cloud storage, and issues a ticket registration transaction in the corresponding per segment security chain 3 that registers the newly bought ticket.

Figure 6:
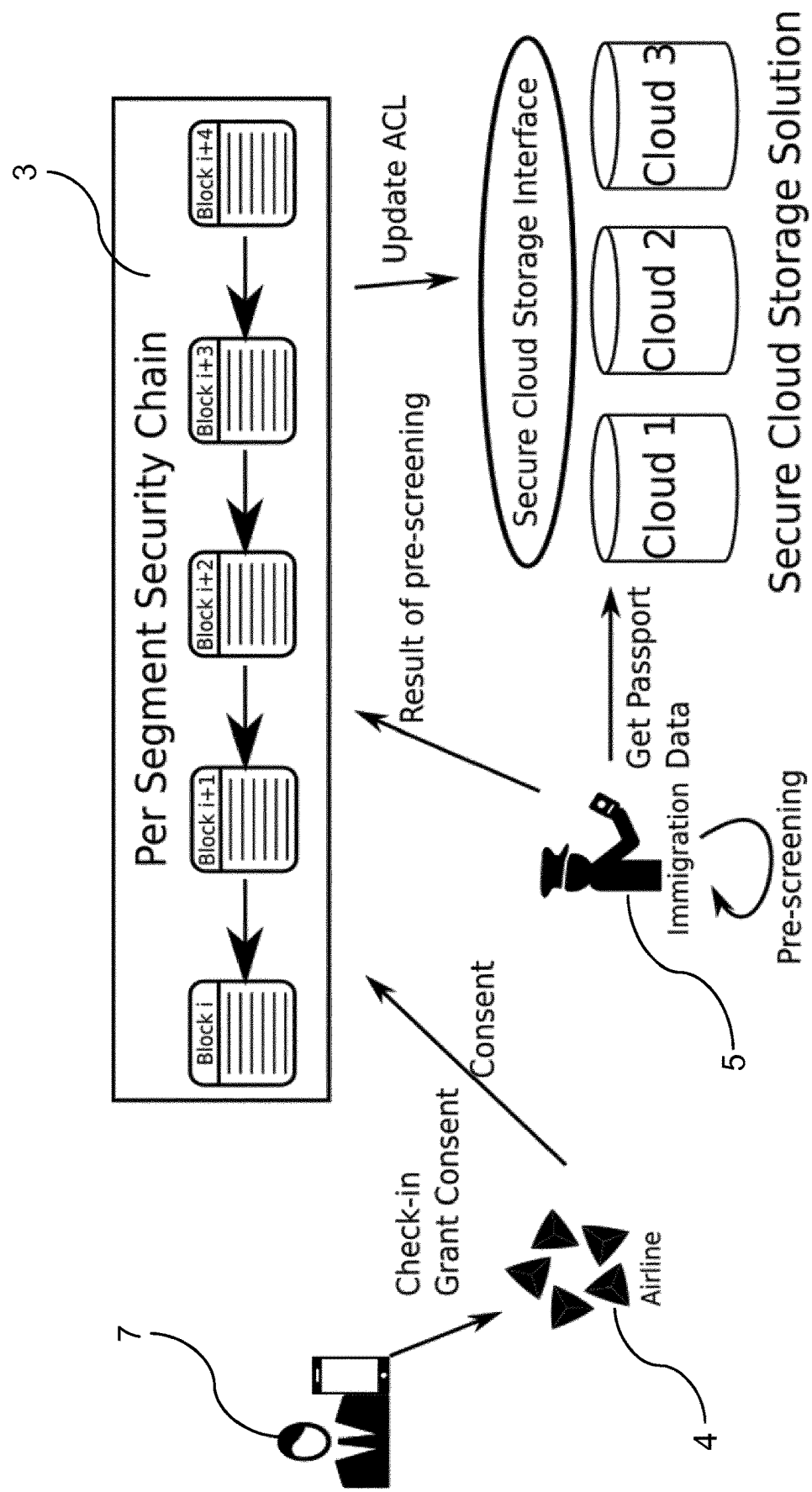
FIG. 6 is a schematic view illustrating an online check-in and pre-screening process in accordance with an embodiment.

FIG. 6 shows a schematic view illustrating an online check-in and pre-screening process in accordance with an embodiment.

Pre-checking: Online Check-in and Pre-screening

As in current flight systems, the traveler 7 has the option of doing an online check-in. In the context of embodiments, the online check-in is used as an opportunity to do an early validation of the traveler's identity, as exemplary illustrated in FIG. 6. Indeed, both departure and arrival immigration department entities 5 use the online check-in step to verify that the traveler 7 is allowed to travel and that all the identity documents are in order.

During the immigration pre-screening, the immigration department entities 5 do not have direct access to the traveler's passport, but only to a rendered image sufficient for them to find a match in their internal databases. The result of this pre-screening is stored in the per segment security chain 3 by issuing a pre-screening transaction that is broadcasted into the per segment security chain 3 of the flight. If the pre-screening fails, the traveler 7 is not allowed to pass through any security check at the airport.

Figure 7:
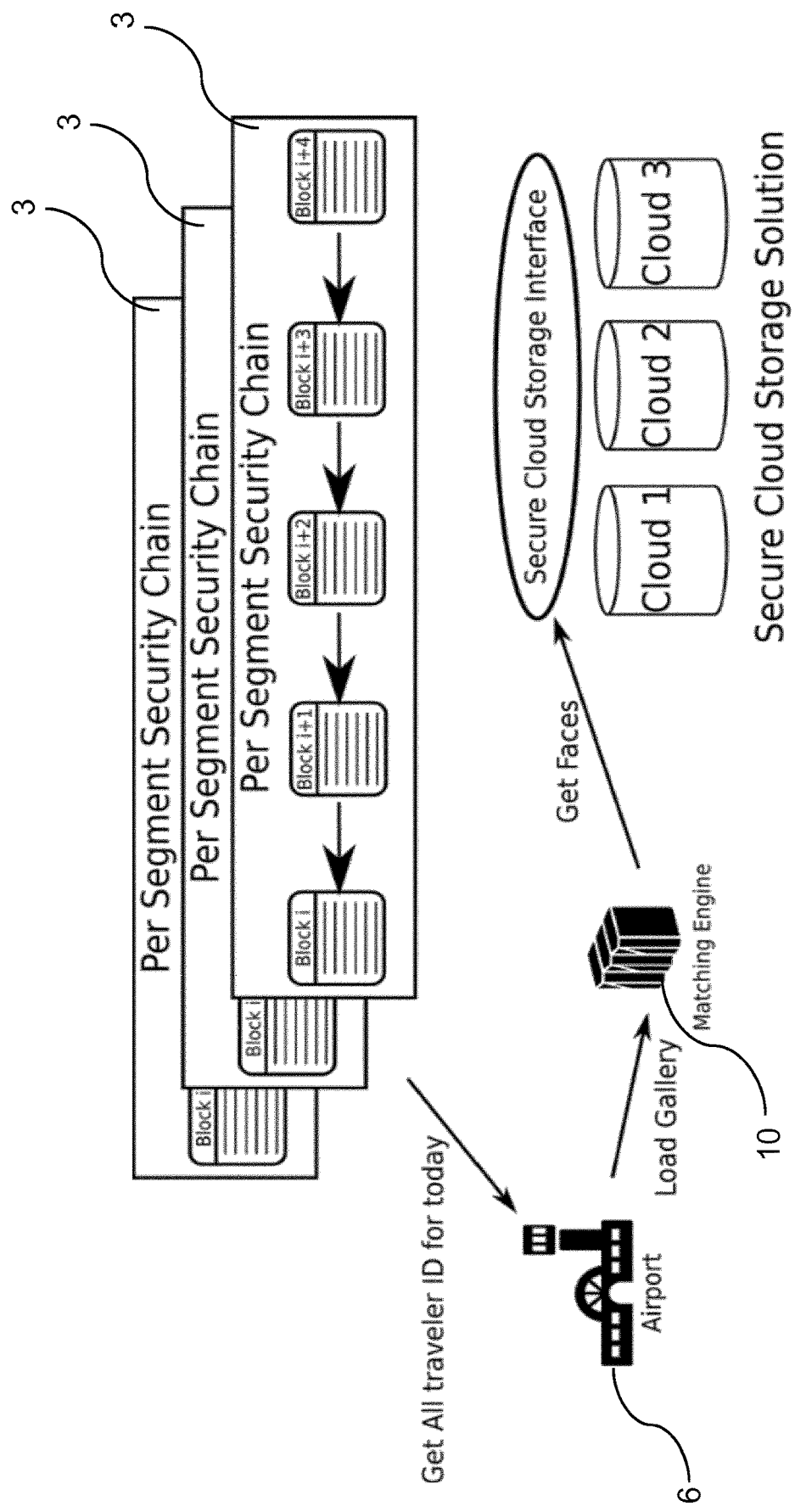
FIG. 7 is a schematic view illustrating a creation of a travelers gallery in accordance with an embodiment.

FIG. 7 shows a schematic view illustrating a creation of a travelers gallery in accordance with an embodiment.

Travelers Gallery

Every day, the per segment security chains 3 may update the ACL of the secure cloud storage to grant read access to biometric identity data of all the day's travelers to the matching engine. The airport entity 6 then creates a travelers gallery by aggregating the TID of all the travelers that are boarding a flight on that day, as exemplary illustrated in FIG. 7.

The travelers gallery is then sent to the airport's matching engine 10 (in the cloud), who, in turn, will query the secure cloud storage to retrieve the face biometric data of every user to be stored in a local database. The resulting subset of face biometric data is used by the matching engine to create a data set to carry out face recognition more efficiently, because the matching algorithm is run in a relatively small set of data when compared to set of face biometric data of all travelers/users. Furthermore, to reduce the amount of data accessed by the matching engine 10 and thus reducing the risk of sensitive data leaks in case of access of the local database by an unauthorized party, this data set is wiped after a predetermined period of time, e.g. at the end of each day.

Figure 8:
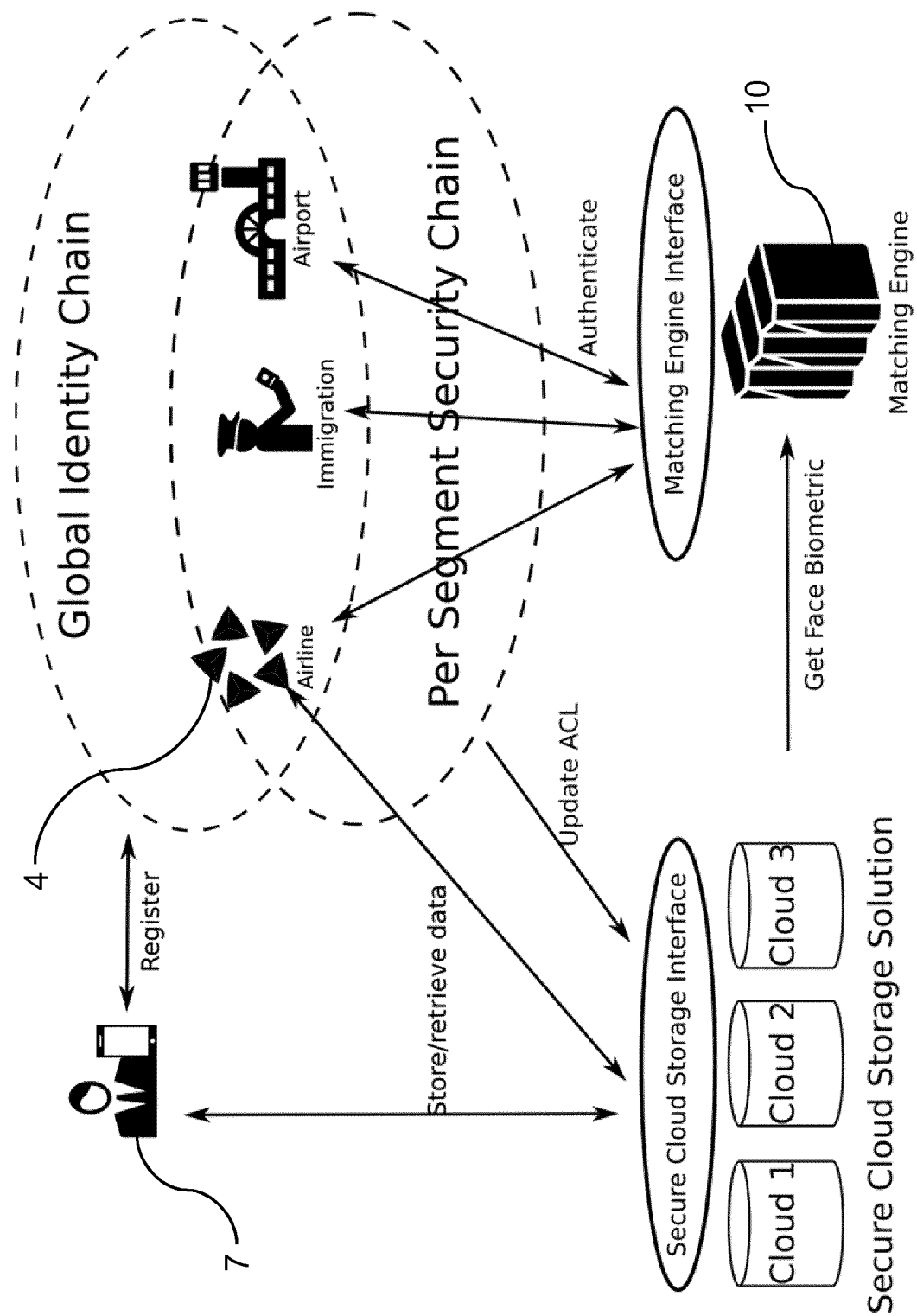
FIG. 8 is a schematic view illustrating an overview of an architecture of a method or a system in accordance with an embodiment.

FIG. 8 shows a schematic view illustrating an overview of an architecture of a method or a distributed ledger system in accordance with an embodiment, wherein the interactions within the network/system are indicated. The workflow of the embodiment of FIG. 8 may be as follows:

Airline entities 4 and travelers 7 cooperate to speed up the travelers' journey through the airport. A software user application acts as an interface to the distributed ledger system, allowing travelers 7 to buy tickets, and upload and verify their identity data such as their passports and biometric data.

A pre-registration process allows for an early screening of the traveler's identity, and gifts the traveler a more streamlined airport experience, while also giving airlines and governments a preliminary assurance that the traveler is allowed to travel and is not dangerous to others. Every step may result in a corresponding transaction in the per segment security chain to faithfully record its outcome in an immutable entry. In the embodiment FIG. 8, a traveler installs a software application on his smartphone that may handle most of the interactions with the various third parties, as well as with the secure cloud storage.

The interactions performed by the embodiment of FIG. 8 may be formed to a coherent workflow that clearly outlines a traveler's journey through a distributed ledger system. Thus, an exemplified workflow might be described as follows:

1. The traveler installs the application and registers to the distributed ledger system.
2. The traveler uses the application to find a suitable flight and buy a ticket.
3. The traveler uploads his passport as well as a picture of his face, and stores a commitment of the documents on the global identity chain.
4. The traveler does an identity verification with a verifier entity. The outcome will be registered on the global identity chain.
5. Before the departure of the plane, the traveler can optionally perform a pre-checking that includes an online check-in and a pre-screening.
6. The per segment security chain issues an ACL update to the secure cloud storage to grant access to the matching engine 10 to all the travelers of the day.
7. The airport creates a travelers gallery with information about travelers that are boarding a flight on that day and sends it to the matching engine 10, so that it can create a face biometric data set over which run the face matching algorithm.
8. Upon arrival at the airport, if the face biometric of the traveler has not been validated yet, the traveler has to go to the check-in desk and has to do an identity validation before being able to proceed.
9. At each checkpoint, image capturing hardware takes a picture of the traveler's face and sends it to the matching engine 10 for authentication. For example as follows:
   a. The automatic baggage drop takes a picture of the traveler's face in order to detect if he is a legitimate traveler; if so, he can drop his baggage. The baggage tag is printed automatically.
   b. At the security checkpoint, the traveler's face is captured again in order to confirm his identity. The traveler does not have to show his passport and his flight ticket. The traveler is given security clearance if he passes the luggage check.
   c. If the traveler wants to use an airline lounge, another face matching is done to establish if he can access the lounge for free, if he has to pay for the entry, or if he is not allowed access at all.
   d. Upon boarding, the face recognition algorithm is executed one last time to verify the traveler's identity. Since the list of travelers boarding the plane is known in advance, the airline can use the identify API of the matching engine 10 with an additional filter on the group from which travelers have to be identified. Only correctly identified travelers will be allowed to board.

In all the above steps, if the matching engine 10 cannot identify the traveler, he will not be able to proceed, as it means the traveler was not registered on a flight of the current day.

10. Upon landing and exiting the plane at the destination airport, the traveler is automatically identified as the arrival airport is a member the security chain too, and therefore has access to all the information required to identify him. To do so, the airport forwards a travelers gallery (see step 7) to the matching engine 10 containing the TID of all the travelers landing at the airport. Further, it is noted that the airport entity does not have access to the face biometric data uploaded to the secure cloud storage, as only the matching engine 10 is authorized to access it.
11. The traveler proceeds to immigration (if required), where the matching engine verifies his identity. Since the immigration already preprocessed most of the data about the traveler, this step should be quick. In case the matching engine 10 fails to identify a traveler, the traveler still needs to show a valid passport to the authorities.

Embodiments of the disclosure, which may implement one or more of the above steps in different combinations, enhance and optimize airport security. Indeed, embodiments allow the different institutions that partake in the air travel security to share identity validation data to increase efficiency and security. Furthermore, it is noted that the aforementioned steps are compliant with data privacy laws as the traveler is always asked for consent before access to his data is granted to third parties and, as data never leaves the cloud, is always in control of his data.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for supporting identity management of travelers in an airport using a distributed ledger system, the distributed ledger system including a global identity blockchain and several security blockchains, the global identity blockchain being accessible by entities of the distributed ledger system, and a respective security blockchain of the several security blockchains being employed for a predetermined flight segment, the respective security blockchain being accessible only by entities of the distributed ledger system that are involved in the predetermined flight segment, the method comprising:

receiving, by the global identity blockchain, a registration request from a traveler via a traveler device, wherein the registration request includes a commitment for identity data that is uploaded by the traveler in a secure cloud storage, recording the commitment in the global identity blockchain, receiving, by the global identity blockchain, a result of an identity verification with respect to the traveler from a verifier entity, recording the result in the global identity blockchain, receiving, by the respective security blockchain, a ticket registration transaction issued by an airline entity, wherein the ticket registration transaction comprises a unique traveler ID of the traveler, and issuing, by the respective security blockchain, an access control list update upon reception of consent by the traveler in order to allow one or more entities to have access to the identity data of the traveler stored in the secure cloud storage.

2. The method according to claim 1, wherein the identity data of the traveler comprises a passport of the traveler and biometric data of the traveler.

3. The method according to claim 2, wherein the identity verification includes performing a passport validation, wherein the traveler grants a verifier entity access to the passport of the traveler that is stored in the secure cloud storage, wherein the verifier entity checks authenticity and validity of the passport of the traveler, and wherein the verifier entity issues a passport validation transaction to the global identity blockchain in response to a successful passport validation.

4. The method according to claim 1, wherein a matching engine is provided, wherein the matching engine has access to biometric data of travelers that is stored in the secure cloud storage, wherein the matching engine is configured to carry out biometric matching upon request by an entity of the distributed ledger system.

5. The method according to claim 4, wherein the matching engine provides an authenticate application programming interface (API), wherein the authenticate API is configured to receive, as input, a travelers gallery and a picture of the traveler, and wherein the authenticate API is configured to output the unique traveler ID of the traveler.

6. The method according to claim 4, wherein the matching engine provides a validate application programming interface (API), wherein the validate API takes as input the unique traveler ID of the traveler and a picture of the traveler, and wherein the validate API outputs true or false depending on whether the picture includes the same person as the biometric data that has been uploaded in the secure cloud storage by the unique traveler ID.

7. The method according to claim 6, wherein the identity verification includes performing a face biometric validation, wherein the traveler grants the matching engine access to the biometric data that is stored in the secure cloud storage, wherein the verifier entity checks an identity of the traveler using a passport that is shown by the traveler during a video call or during a check-in at the airport, wherein the verifier entity additionally takes a picture of the traveler during the video call or during the check-in at the airport, and wherein the verifier entity issues a validate query to the matching engine by providing the traveler ID and the taken picture as input for the validate API of the matching engine.

8. The method according to claim 7, wherein, upon completion of the face biometric validation, the verifier entity issues an identity validation transaction to the global identity blockchain.

9. The method according to claim 1, further comprising:
recording, by the respective security blockchain, an outcome of a pre-checking process, wherein the pre-checking process includes an online check-in and a pre-screening of the traveler, wherein the pre-checking process is performed/used by an immigration department entity to verify that the traveler is allowed to travel and that the identity data of the traveler is valid.

10. The method according to claim 9, wherein the immigration department entity issues a pre-screening transaction to the respective security blockchain in order to record the outcome of the pre-checking process in the security blockchain of the flight segment of the traveler.

11. The method according to claim 9, wherein the immigration department entity does not have direct access to the traveler's passport that is stored in the secure cloud storage, wherein the immigration department entity only has access to a rendered image of the traveler's passport sufficient to find a match in an internal database of the immigration department entity.

12. The method according to claim 1, further comprising creating, by the respective security blockchain, a list of traveler IDs of travelers traveling in a predetermined time period.

13. The method according to claim 1, further comprising recording, by the security blockchain, a passage of the traveler through checkpoints of the airport.

14. A distributed ledger system for supporting identity management of travelers in an airport, the distributed ledger system comprising:
several entities interconnected via blockchain technology;
a global identity blockchain; and
several security blockchains,
wherein the global identity blockchain is configured to be accessible by the several entities of the distributed ledger system,
wherein a respective security blockchain of the several security blockchains is configured to be employed for a predetermined flight segment, the respective security blockchain being accessible only to entities of the distributed ledger system that are involved in the predetermined flight segment,
wherein the global identity blockchain is further configured to receive a registration request from a traveler via a traveler device, the registration request including a commitment for identity data that is uploaded by the traveler in a secure cloud storage, the commitment being recorded in the global identity blockchain,
wherein the global identity blockchain is further configured to receive a result of an identity verification with respect to the traveler from a verifier entity, the result being recorded in the global identity blockchain,
wherein the respective security blockchain is configured to receive a ticket registration transaction issued by an airline entity, wherein the ticket registration transaction comprises a unique traveler ID of the traveler, and wherein the respective security blockchain is configured to issue an access control list update upon reception of consent by the traveler in order to allow one or more entities to have access to the identity data of the traveler stored in the secure cloud storage.

\* \* \* \* \*